(12) United States Patent
Nomura

(10) Patent No.: US 7,791,770 B2
(45) Date of Patent: Sep. 7, 2010

(54) IMAGE PROCESSING APPARATUS, CONTROL METHOD AND PROGRAM THEREFOR

(75) Inventor: Nobushige Nomura, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 965 days.

(21) Appl. No.: 11/600,019

(22) Filed: Nov. 16, 2006

(65) Prior Publication Data

US 2007/0139701 A1 Jun. 21, 2007

(30) Foreign Application Priority Data

Dec. 6, 2005 (JP) ............................. 2005-352334

(51) Int. Cl.
*H04N 1/04* (2006.01)
*H04N 1/00* (2006.01)
(52) U.S. Cl. ...................................... 358/474; 358/404
(58) Field of Classification Search ................ 358/443, 358/448, 404, 444, 1.16, 474, 471, 1.9, 2.1; 707/100
See application file for complete search history.

(56) References Cited

U.S. PATENT DOCUMENTS

| 2003/0097251 | A1* | 5/2003 | Yamada et al. ............... 704/7 |
|---|---|---|---|
| 2004/0015492 | A1* | 1/2004 | Fujita et al. ................... 707/3 |
| 2004/0260650 | A1* | 12/2004 | Nagaya et al. ............... 705/43 |
| 2007/0043719 | A1* | 2/2007 | Nagamine et al. ............. 707/5 |
| 2007/0071197 | A1* | 3/2007 | Ryoo ....................... 379/114.15 |
| 2007/0176937 | A1* | 8/2007 | Koshimizu et al. .......... 345/530 |
| 2008/0195637 | A1* | 8/2008 | Anegawa et al. ........... 707/100 |

FOREIGN PATENT DOCUMENTS

| JP | 11-205558 | 7/1999 |
|---|---|---|
| JP | 2002-197101 | 7/2002 |
| JP | 2003326777 | * 11/2003 |

* cited by examiner

*Primary Examiner*—Jerome Grant, II
(74) *Attorney, Agent, or Firm*—Fitzpatrick, Cella, Harper & Scinto

(57) ABSTRACT

A scanned image is registered in a storage unit. Attribute information for managing a registered image is set in an attribute information table. The relationship between the registered image and a related image in the storage unit is set in a related information table together with the attribute information. The storage unit is searched for an image specified by attribute information embedded in the scanned image. An image related to the image found by a search is acquired from the storage unit by looking up the related information table, and the relation view of the images is created. An operation window including the created relation view is displayed.

11 Claims, 23 Drawing Sheets

FIG. 3

| DOCUMENT ID | REGISTRATION DATE | Tree ID | REGISTRANT | NUMBER OF COPIES | FILE NAME |
|---|---|---|---|---|---|
| 1 | 2005/3/10 | 1 | User_A | 20 | 1.tiff |
| 2 | 2005/3/11 | 1 | User_A | 20 | 2.tiff |
| 3 | 2005/3/12 | 1 | User_A | 20 | 3.tiff |
| 4 | 2005/3/13 | 1 | User_B | 0 | 4.tiff |
| 5 | 2005/3/14 | 1 | User_C | 20 | 5.tiff |
| 6 | 2005/3/15 | 1 | User_D | 20 | 6.tiff |
| 7 | 2005/3/16 | 1 | User_D | 0 | 7.tiff |
| 8 | 2005/3/17 | 1 | User_B | 0 | 8.tiff |
| 9 | 2005/3/18 | 1 | User_B | 0 | 9.tiff |
| 10 | 2005/3/19 | 1 | User_B | 20 | 10.tiff |
| 11 | 2005/3/20 | 1 | User_C | 0 | 11.tiff |
| 12 | 2005/3/21 | 1 | User_C | 20 | 12.tiff |
| 13 | 2005/3/22 | 1 | User_D | 20 | 13.tiff |
| 14 | 2005/3/23 | 1 | User_D | 0 | 14.tiff |
| 15 | 2005/3/24 | 1 | User_D | 20 | 15.tiff |
| 16 | 2005/3/25 | 1 | User_D | 0 | 16.tiff |
| 17 | 2005/3/26 | 1 | User_D | 0 | 17.tiff |
| 18 | 2005/3/27 | 1 | User_A | 0 | 18.tiff |
| 19 | 2005/3/28 | 1 | User_A | 20 | 19.tiff |
| 20 | 2005/3/29 | 20 | User_E | 0 | 20.tiff |

| DOCUMENT ID | REGISTRANT | SHARE (ACCESS RIGHT) |
|---|---|---|
| 1 | 1 | 1 |
| 2 | 1 | 1 |
| 3 | 1 | 1 |
| 4 | 1 | 1 |
| 5 | 1 | 1 |
| 6 | 1 | 1 |
| 7 | 1 | 0 |
| 8 | 1 | 0 |
| 9 | 1 | 0 |
| 10 | 1 | 1 |
| 11 | 1 | 1 |
| 12 | 1 | 1 |
| 13 | 1 | 1 |
| 14 | 1 | 0 |
| 15 | 1 | 1 |
| 16 | 1 | 0 |
| 17 | 1 | 0 |
| 18 | 1 | 1 |
| 19 | 1 | 1 |
| 20 | 1 | 1 |

FIG. 5

| DOCUMENT ID | RELATED DOCUMENT ID | RELATIONSHIP |
|---|---|---|
| 1 |  | NEW |
| 2 | 1 | UPDATE |
| 3 | 2 | UPDATE |
| 4 | 3 | UPDATE |
| 5 | 1 | DERIVATIVE |
| 6 | 5 | UPDATE |
| 7 | 5 | DERIVATIVE |
| 8 | 2 | DERIVATIVE |
| 9 | 8 | UPDATE |
| 10 | 4 | UPDATE |
| 11 | 6 | UPDATE |
| 12 | 11 | UPDATE |
| 13 | 12 | UPDATE |
| 14 | 7 | UPDATE |
| 15 | 14 | UPDATE |
| 16 | 7 | DERIVATIVE |
| 17 | 16 | UPDATE |
| 18 | 15 | UPDATE |
| 19 | 13 | UPDATE |

FIG. 6

| DOCUMENT ID | RELATED DOCUMENT ID | RELATIONSHIP |
|---|---|---|
| 20 | | NEW |

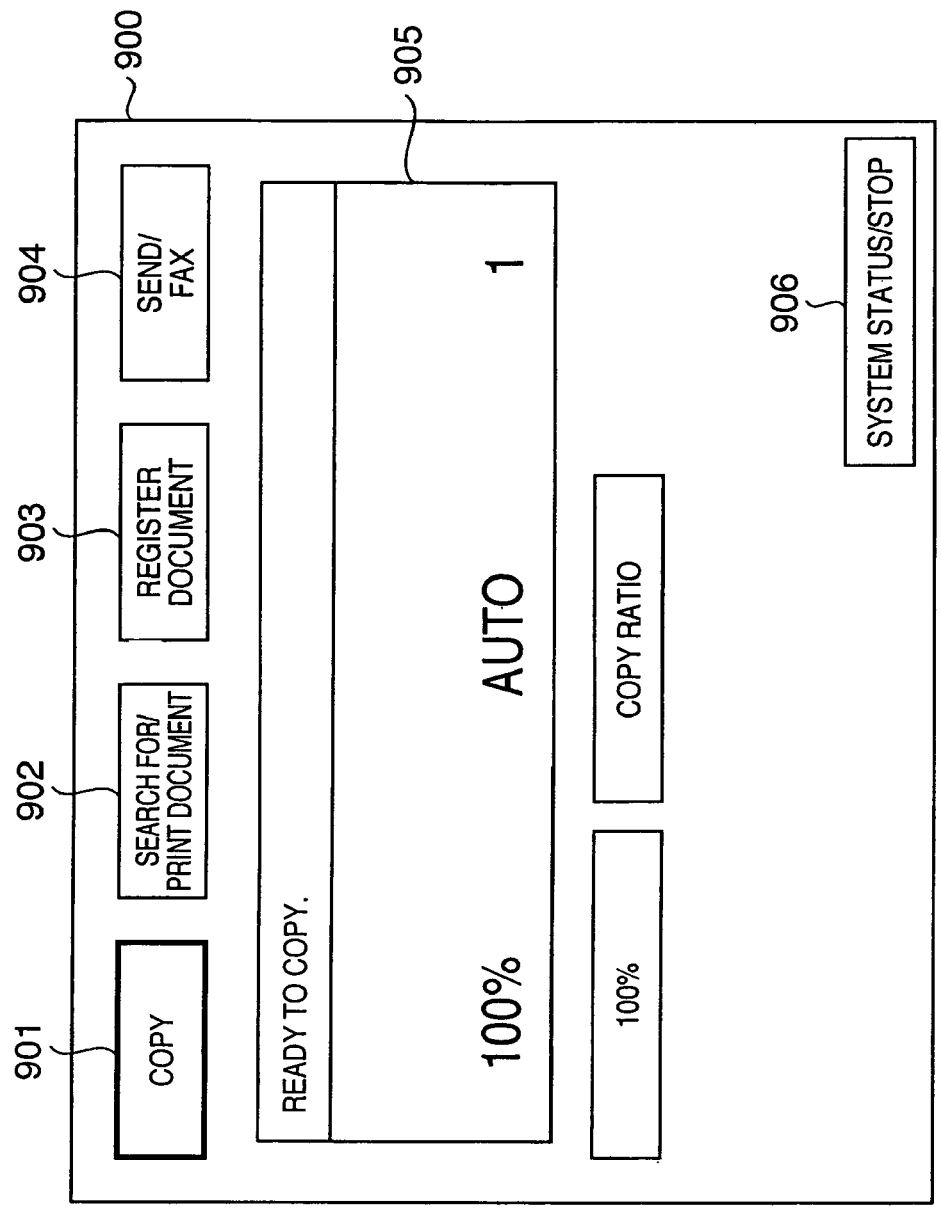

Req : User_B, DOCUMENT ID=2, Filter=ALL DOCUMENTS

| DOCUMENT ID | RELATED DOCUMENT ID | RELATIONSHIP |
|---|---|---|
| 1 |  | NEW |
| 2 | 1 | UPDATE |
| 3 | 2 | UPDATE |
| 4 | 3 | UPDATE |
| 5 | 1 | DERIVATIVE |
| 6 | 5 | UPDATE |
| 7 | 5 | DERIVATIVE |
| 8 | 2 | DERIVATIVE |
| 9 | 8 | UPDATE |
| 10 | 4 | UPDATE |
| 11 | 6 | UPDATE |
| 12 | 11 | UPDATE |
| 13 | 12 | UPDATE |
| 14 | 7 | UPDATE |
| 15 | 14 | UPDATE |
| 16 | 7 | DERIVATIVE |
| 17 | 16 | UPDATE |
| 18 | 15 | UPDATE |
| 19 | 13 | UPDATE |

FIG. 10B

| DOCUMENT ID | RELATED DOCUMENT ID | RELATIONSHIP |
|---|---|---|
| 1 |  | NEW |
| 2 | 1 | UPDATE |
| 3 | 2 | UPDATE |
| 4 | 3 | UPDATE |
| 5 | 1 | DERIVATIVE |
| 6 | 5 | UPDATE |
| ~~7~~ | ~~5~~ | ~~DERIVATIVE~~ |
| 8 | 2 | DERIVATIVE |
| 9 | 8 | UPDATE |
| 10 | 4 | UPDATE |
| 11 | 6 | UPDATE |
| 12 | 11 | UPDATE |
| 13 | 12 | UPDATE |
| ~~14~~ | ~~7~~ | ~~UPDATE~~ |
| 15 | 14 | UPDATE |
| ~~16~~ | ~~7~~ | ~~DERIVATIVE~~ |
| ~~17~~ | ~~16~~ | ~~UPDATE~~ |
| 18 | 15 | UPDATE |
| 19 | 13 | UPDATE |

※ DOCUMENTS FOR WHICH USER DOES NOT HAVE ACCESS RIGHT ARE EXTRACTED.

| DOCUMENT ID | RELATED DOCUMENT ID | RELATIONSHIP |
|---|---|---|
| 1 | | NEW |
| 2 | 1 | UPDATE |
| 3 | 2 | UPDATE |
| 4 | 3 | UPDATE |
| 5 | 1 | DERIVATIVE |
| 6 | 5 | UPDATE |
| 8 | 2 | DERIVATIVE |
| 9 | 8 | UPDATE |
| 10 | 4 | UPDATE |
| 11 | 6 | UPDATE |
| 12 | 11 | UPDATE |
| 13 | 12 | UPDATE |
| 15 | 14 | UPDATE |
| 18 | 15 | UPDATE |
| 19 | 13 | UPDATE |

※ RELATIONSHIP BETWEEN DOCUMENTS EXCEPT DOCUMENTS FOR WHICH USER DOES NOT HAVE ACCESS RIGHT IS ADJUSTED.

※ DOCUMENTS FOR WHICH USER DOES NOT HAVE ACCESS RIGHT ARE DELETED.

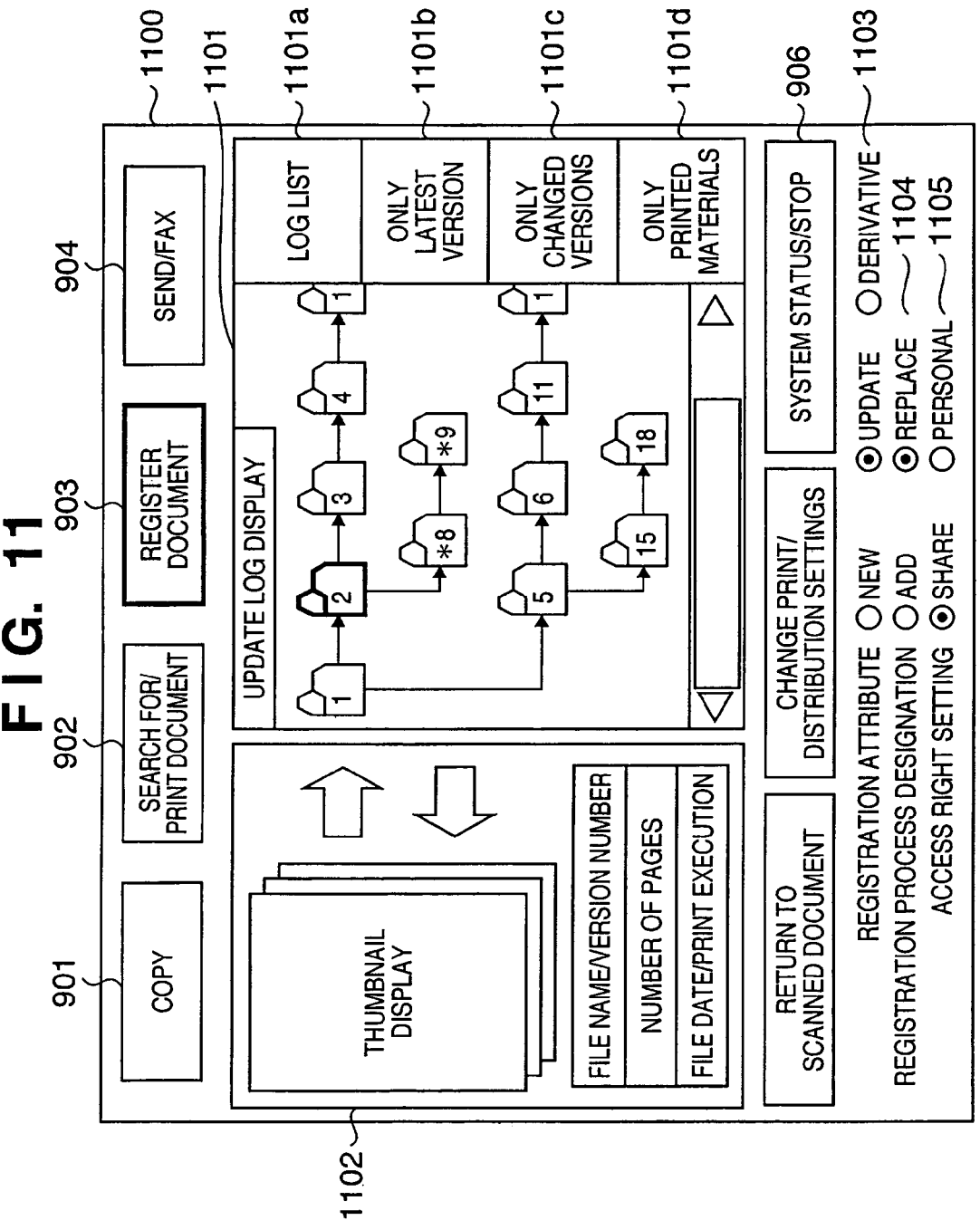

Req : User_B, ID=2, Filter=LATEST

F I G. 14
Req : User_B, ID=2, Filter=UPDATE DOCUMENT
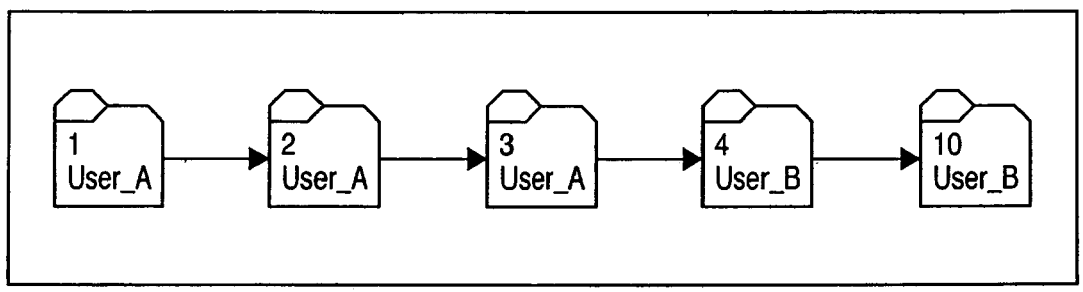

Req : User_B, ID=2, Filter=DESIGNATED DOCUMENT AND SUBSEQUENT DOCUMENTS

Req : User_B, ID=2, Filter=NUMBER OF COPIES > 10

IMAGE PROCESSING APPARATUS, CONTROL METHOD AND PROGRAM THEREFOR

BACKGROUND OF THE INVENTION

1. Field of the Invention

The present invention relates to an image processing apparatus comprising a scanning unit for scanning an image and a storage unit for storing an image, a control method and a program therefor.

2. Description of the Related Art

Japanese Patent Laid-Open No. 11-205558, et al., proposes a technique capable of preventing degradation by copying and sparing effort used to unbind sheets bound by staples, etc. According to this technique, in copying or printing, additional information for specifying a document is embedded and printed using information such as a barcode in a print image. In copying the printed material, the embedded additional information is used to search for electronic data of the corresponding document, and the document is printed.

Japanese Patent Laid-Open No. 2002-197101, et al., proposes a technique capable of eliminating cumbersome work entailed in a user confirming whether the latest version is the one to be printed or not. According to this technique, a document management system manages updating of a document file. When a user is to copy a document using a document ID embedded in a document image and the document management system detects a new version of a document, the system replaces the old version of the document with the new version of the document and prints the substituted document.

However, the conventional technique only prevents quality degradation by using additional information embedded in a printed material when printing using original printed data, or prints by replacing an old version with the latest one when original data is updated.

What the user requires, however, is not always acquisition of the latest version. For example, if a user is to confirm a change from his printed material, he requires information on preceding printed material for comparison purposes. However, the conventional techniques do not take into account any technique of providing this information.

Additionally, the number of latest versions is not always one, and a user cannot select a desired document from however many derivations may exist.

SUMMARY OF THE INVENTION

The present invention has been made to overcome the conventional drawbacks, and has as its object to provide an image processing apparatus capable of using additional information for specifying a document embedded in a document image, presenting a user with documents related to the specified document, and allowing the user to selectively acquire a desired document, together with a control method and a program therefor.

According to the present invention, the foregoing object is attained by providing an image processing apparatus having a scanning unit for scanning an image and a storage unit for storing an image, comprising:

a registration unit adapted to register an image scanned by the scanning unit in the storage unit;

a first setting unit adapted to set, in an attribute information table, attribute information for managing an image registered by the registration unit;

a second setting unit adapted to set, in a related information table together with the attribute information, relationship between the image registered by the registration unit and a related image in the storage unit;

a search unit adapted to search the storage unit for an image specified by attribute information embedded in the image scanned by the scanning unit;

a creation unit adapted to acquire an image related to the image found by a search by the search unit from the storage unit by looking up the related information table, and create a relation view of the images; and a display unit adapted to display an operation window including the relation view created by the creation unit.

In a preferred embodiment, the apparatus further comprises an output unit adapted to output, to a designated output destination, an image designated via the operation window displayed by the display unit.

In a preferred embodiment, the apparatus further comprises:

a third setting unit adapted to set, in an access list for each attribute information, a right to access a corresponding image;

an authentication unit adapted to authenticate a user who operates the image processing apparatus; and a determination unit adapted to determine, by referring to the access list, whether the user authenticated by the authentication unit has a right to access the image found by a search by the search unit, wherein the creation unit acquires the image related to the image found by a search by the search unit on the basis of a determination result of the determination unit by looking up the related information table, and creates the relation view of the images.

In a preferred embodiment, the output unit embeds corresponding attribute information in the designated image and prints the designated image.

In a preferred embodiment, when the registration unit is to register an image, the creation unit acquires an image related to attribute information embedded in the image to be registered from the storage unit by looking up the related information table, and creates the relation view of the images, and the display unit displays an operation window including the relation view created by the creation unit, and a first designation portion for designating an update/derivative of the image to be registered as attribute information of the image which is designated on the basis of the relation view and is to be registered.

In a preferred embodiment, the display unit comprises, on the operation window, a second designation portion for designating to add the image to be registered to a designated image and register the image, or to replace a designated image with the image to be registered and register the image.

In a preferred embodiment, the attribute information contains information representing a related information table to which an image belongs, a storage location of the image, a user ID of a user who designates registration of the image by the registration unit, and the number of copies of the image.

In a preferred embodiment, the related information table sets at least attribute information of an image registered by the registration unit, and registration attribute information designated in registration.

According to the present invention, the foregoing object is attained by providing a method of controlling an image processing apparatus having a scanning unit for scanning an image and a storage unit for storing an image, comprising:

a registration step of registering an image scanned by the scanning unit in the storage unit;

a first setting step of setting, in an attribute information table, attribute information for managing an image registered in the registration step;

a second setting step of setting, in a related information table together with the attribute information, relationship between the image registered in the registration step and a related image in the storage unit;

a search step of searching the storage unit for an image specified by attribute information embedded in the image scanned by the scanning unit;

a creation step of acquiring an image related to the image found by a search in the search step from the storage unit by looking up the related information table, and creating a relation view of the images; and a display step of displaying an operation window including the relation view created in the creation step.

According to the present invention, the foregoing object is attained by providing a program which is stored in a computer-readable medium and causes a computer to control an image processing apparatus having a scanning unit for scanning an image and a storage unit for storing an image, causing the computer to execute a registration step of registering an image scanned by the scanning unit in the storage unit, a first setting step of setting, in an attribute information table, attribute information for managing an image registered in the registration step, a second setting step of setting, in a related information table together with the attribute information, relationship between the image registered in the registration step and a related image in the storage unit, a search step of searching the storage unit for an image specified by attribute information embedded in the image scanned by the scanning unit, a creation step of acquiring an image related to the image found by a search in the search step from the storage unit by looking up the related information table, and creating a relation view of the images, and a display step of displaying an operation window including the relation view created in the creation step.

Further features of the present invention will be apparent from the following description of exemplary embodiments (with reference to the attached drawings).

BRIEF DESCRIPTION OF THE DRAWINGS

FIG. 3 is a table showing an example of a document ID table according to the embodiment of the present invention;

FIG. 4 is a table showing an example of a document ID access right list according to the embodiment of the present invention;

FIG. 5 is a table showing an example of a document ID tree table according to the embodiment of the present invention;

FIG. 6 is a table showing another example of the document ID tree table according to the embodiment of the present invention;

FIG. 9 is a view showing an example of a function selection window according to the embodiment of the present invention;

FIGS. 10A-10C are tables for explaining creation of a document ID tree display table according to the embodiment of the present invention;

FIG. 11 is a view showing an example of a document registration window according to the embodiment of the present invention;

FIG. 14 is a view showing still another example of the structure of the document ID tree display table according to the embodiment of the present invention;

DESCRIPTION OF THE EMBODIMENT

A preferred embodiment of the present invention will now be described in detail with reference to the drawings. It should be noted that the relative arrangement of the components, the numerical expressions and numerical values set forth in the embodiment do not limit the scope of the present invention unless it is specifically stated otherwise. Following is a detailed description of embodiments of the present invention, with reference to the drawings.

An example of an application to a network-compatible multifunctional peripheral (MFP) will be described as an embodiment.

The present invention will describe a document update management system using a multifunctional image forming apparatus including a scanner function, print function, image processing function, and network connection function. More specifically, the present invention will explain a document update/management system capable of searching for a related document on the basis of a document ID embedded in a copy image in cooperation with a document management function, and allowing a user to acquire a desired document.

Figure 1:
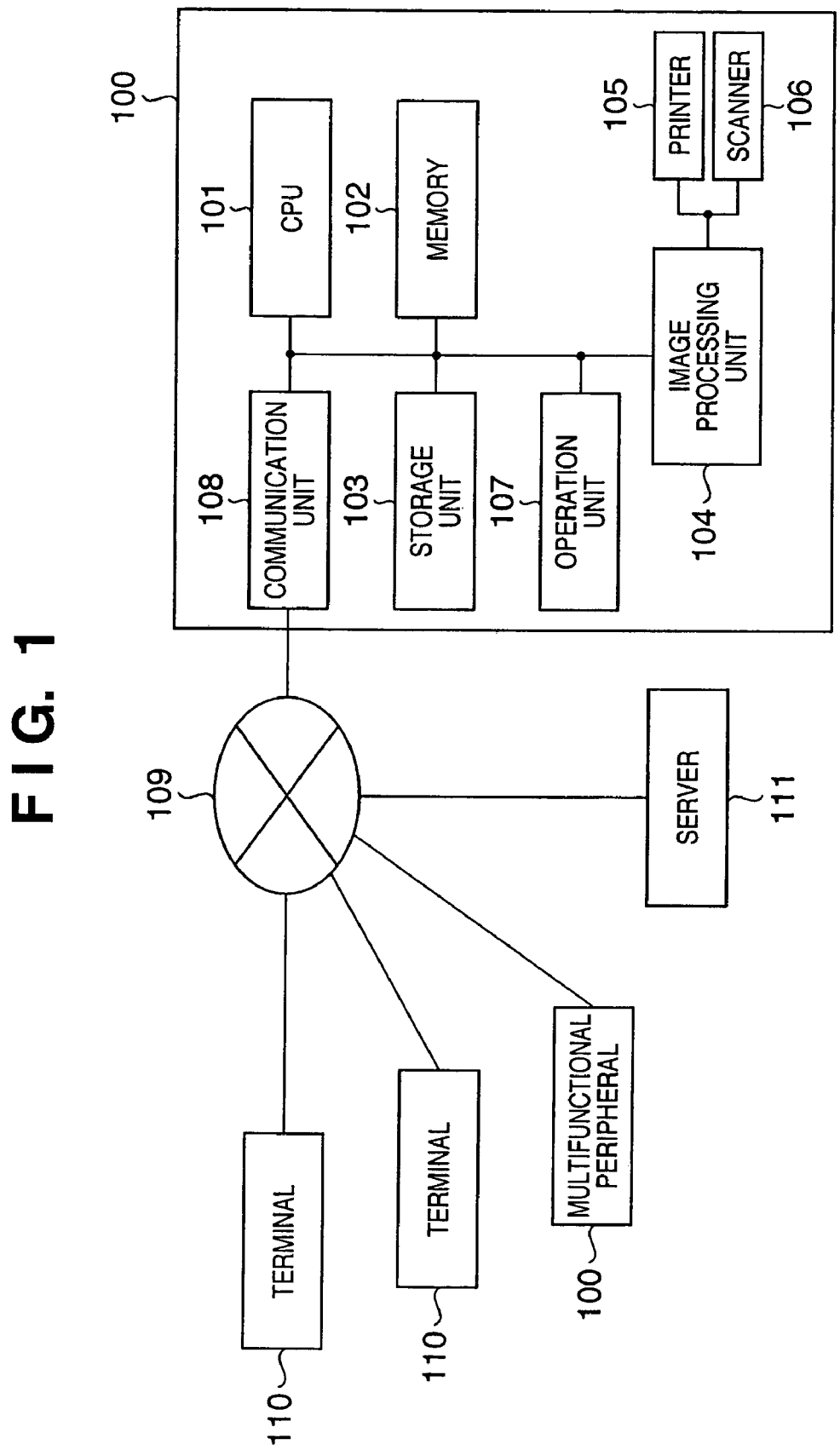
FIG. 1 is a block diagram showing the schematic configuration of a document update/management system including a network-compatible multifunctional peripheral according to an embodiment of the present invention.

FIG. 1 is a block diagram showing the schematic configuration of a document update/management system including a network-compatible multifunctional peripheral according to the embodiment of the present invention.

In FIG. 1, reference numeral 100 denotes a multifunctional peripheral (MFP) serving as a network-compatible multifunctional peripheral (MFP) which provides a computer terminal 110 connectable via a network 109 with various services such as a print service, scan service, and FAX service. The multifunctional peripheral 100 can connect to a server 111 via the network 109 to use services running on the server 111, or can connect to another multifunctional peripheral 100 on the network 109.

The MFP stands for a "multifunctional peripheral."

The hardware configuration of the multifunctional peripheral 100 comprises a CPU (Central Processing Unit) 101, memory 102, storage unit 103, image processing unit 104, printer 105, scanner 106, operation unit 107, communication unit 108, and the like.

The CPU 101 is a computer which executes programs for implementing various functions in the image processing unit 104. The communication unit 108 communicates via the network 109. More specifically, the CPU 101 reads out, from the storage unit 103, programs (application program and the like) for implementing various functions, uses the memory 102 as a work area, and executes the readout programs. The storage unit 103 saves various data such as scanned images, printed images, and setting information, in addition to various programs including programs for implementing the embodiment.

The operation unit 107 comprises an input unit made up of buttons, keys, a touch panel, and the like, and a display unit made up of an LCD, LED, and the like. The operation unit 107 is a user interface which controls user log-in, function selection of the multifunctional peripheral 100, change of settings, and the like.

The storage unit 103 includes storage media such as a hard disk, RAM, and ROM. The printer 105 is, e.g., a laser beam printer, but is not limited to this and may be a printer of another printing type such as an inkjet printer or thermal transfer printer. The scanner 106 has an auto document feeder (ADF), and can automatically successively scan a plurality of document sheets.

The network 109 is typically any one of the Internet, LAN, WAN, telephone line, dedicated digital circuit, ATM, frame relay line, communication satellite channel, cable television line, data broadcasting radio channel, and the like. The network 109 is a so-called communication network implemented by a combination of these means, provided that it is capable of transmitting and receiving data.

The functional arrangement of the multifunctional peripheral 100 functioning as an image processing apparatus according to the embodiment will be explained with reference to FIG. 2.

Figure 2:
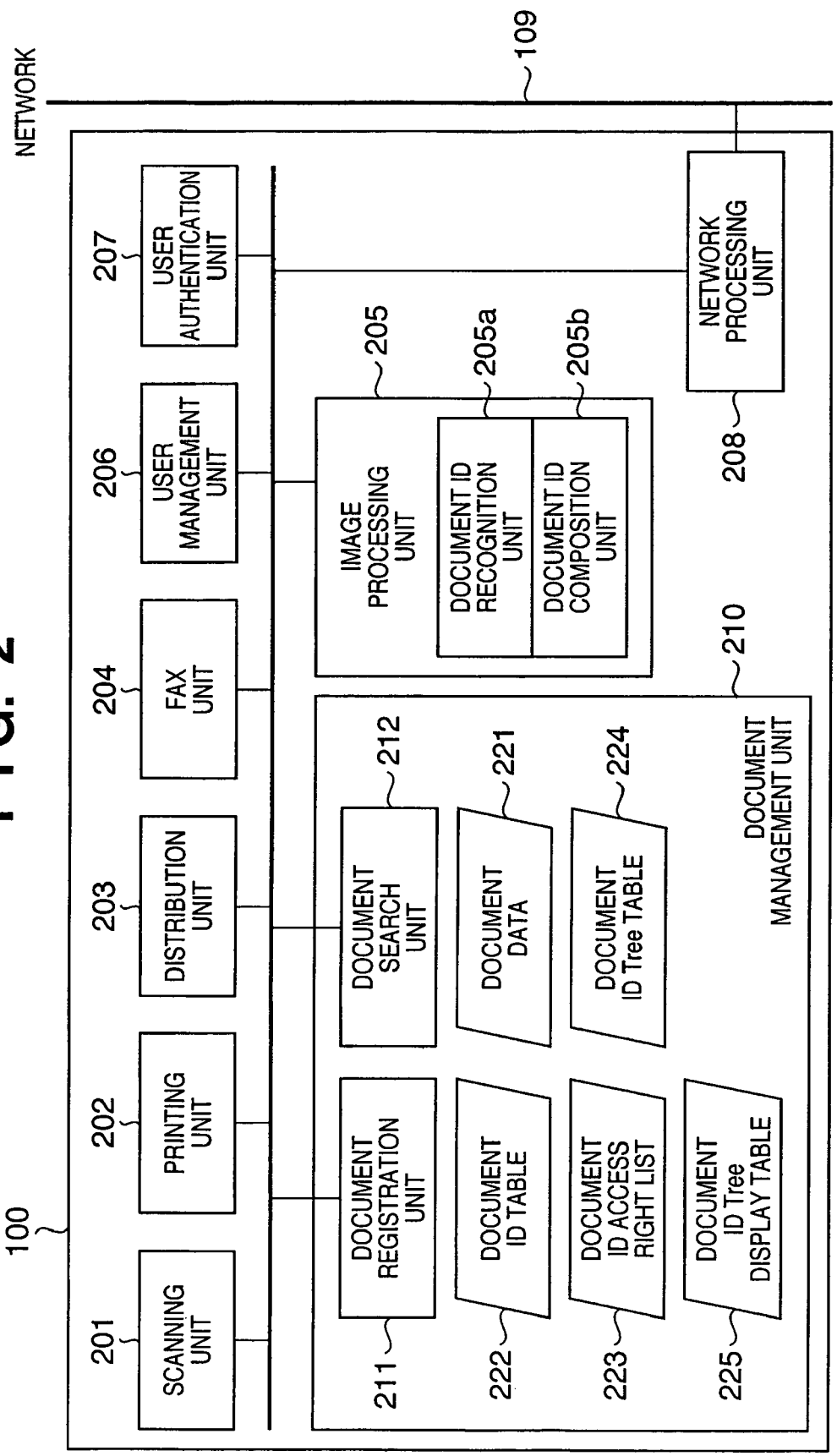
FIG. 2 is a block diagram showing the functional arrangement of the multifunctional peripheral according to the embodiment of the present invention.

FIG. 2 is a block diagram showing the functional arrangement of the multifunctional peripheral according to the embodiment of the present invention.

As various functions for performing the basic operation of the multifunctional peripheral, the multifunctional peripheral 100 comprises, for example, a scanning unit 201, a printing unit 202, a distribution unit 203, a FAX unit 204, a image processing unit 205, a user management unit 206, a user authentication unit 207, and a network processing unit 208. The multifunctional peripheral 100 further comprises a document management unit 210 which is a feature of the present invention.

The document management unit 210 is a function of updating and managing a document, which is a feature of the present invention. The document management unit 210 incorporates a document registration unit 211 and document search unit 212. The document management function of the document management unit 210 is implemented using pieces of information such as a document data 221, a document ID table 222, a document ID access right (permission) list 223, a document ID tree table 224, and a document ID tree display table 225. For example, the memory 102 stores and manages the data and tables.

The document registration unit 211 has a function of newly registering unregistered document data, and registering document data in relation to registered document data. When registering document data in relation to original document data, it is possible to add pages to the original document data to be related or replace the entire document data. At this time, a document ID composition unit 205b can embed a document ID (e.g., a predetermined text, barcode, or copy-forgery-inhibited pattern) in thumbnails of the cover and pages of registered document data for the purpose of a registered record or subsequent extraction, and the printing unit 202 can output the resulting document data.

The document search unit 212 scans a document ID-embedded printed material using the scanning unit 201. A document ID recognition unit 205a recognizes the document ID from the scanned image, searches for related document data on the basis of the document ID, and presents document data found by a search to a user. The user is prompted to select desired document data from the presented document data. The document ID composition unit 205b embeds a document ID in the document data selected by the user. The printing unit 202 prints the resulting document data.

The document data 221 is a saved document itself. According to the embodiment, the document data 221 is a data file obtained by using the image processing unit 205 to perform image processing for image data scanned by the scanning unit 201. The document data 221 is saved in an area in the storage unit 103 that is managed by the document management unit 210.

The document data 221 is not limited to an image, and may be a character code document, data created from application data or the like, or printable data. Depending on the arrangement, the save location is not limited to within the multifunctional peripheral 100. The save location may be the storage unit 103 in another network-connected MFP 100, or may be on the network-connected server 111.

The document ID table 222 is an attribute information table which records attribute information for managing the document data 221. The attribute information includes a document ID uniquely assigned to the document data 221, the registration date & time, registrant information, and the document storage location (file name or path information). In addition, the attribute information includes the number of copies of the document data 221, and a document ID tree number (ID), to be described later, representing a group to which document data related to the document data 221 belong. FIG. 3 shows an example of the document ID table 222 for managing document IDs.

The document ID access right list 223 records the access right assigned to the user of the multifunctional peripheral 100 to the document ID. The document ID access right list 223 is an access list which records access rights to document data on the basis of information on users and user groups that is managed by the user management unit 206. The access right can be designated from the operation unit 107 in registering document data, and may also be automatically set in accordance with user information, the save location, and the like. FIG. 4 shows an example of the document ID access right list 223.

As shown in FIG. 4, the document ID access right list 223 defines, in accordance with the document ID, whether to permit a registrant and other users to access a file. The access right may be set for each user or user group. For present purposes, granting access permissions means sharing a file. In the document ID access right list 223, "1" is set as a value signifying that access permissions have been granted, i.e., a file is being shared, and "0" is set as a value representing access permissions being denied, i.e., a file is not shared.

The document ID tree table 224 is managed for each newly registered document data, i.e., principal document data, without relating the document ID tree table 224 to another document data. The document ID tree table 224 uses the tree structure to record the relationship between document data. That is, the document ID tree table 224 functions as a related information table for managing information representing the relationship to document data. FIG. 5 shows an example of the document ID tree table 224.

As shown in FIG. 5, the document ID tree table 224 concerns document IDs, and exhibits the relationship between the document ID of document data and its related document ID. According to the embodiment, there are three relationships between document data: "new," signifying principal document data, "updated," signifying that related document data of a new version is registered, and "derivative," signifying that related document data is registered not with a new version but with different content or for another purpose.

Figure 7:
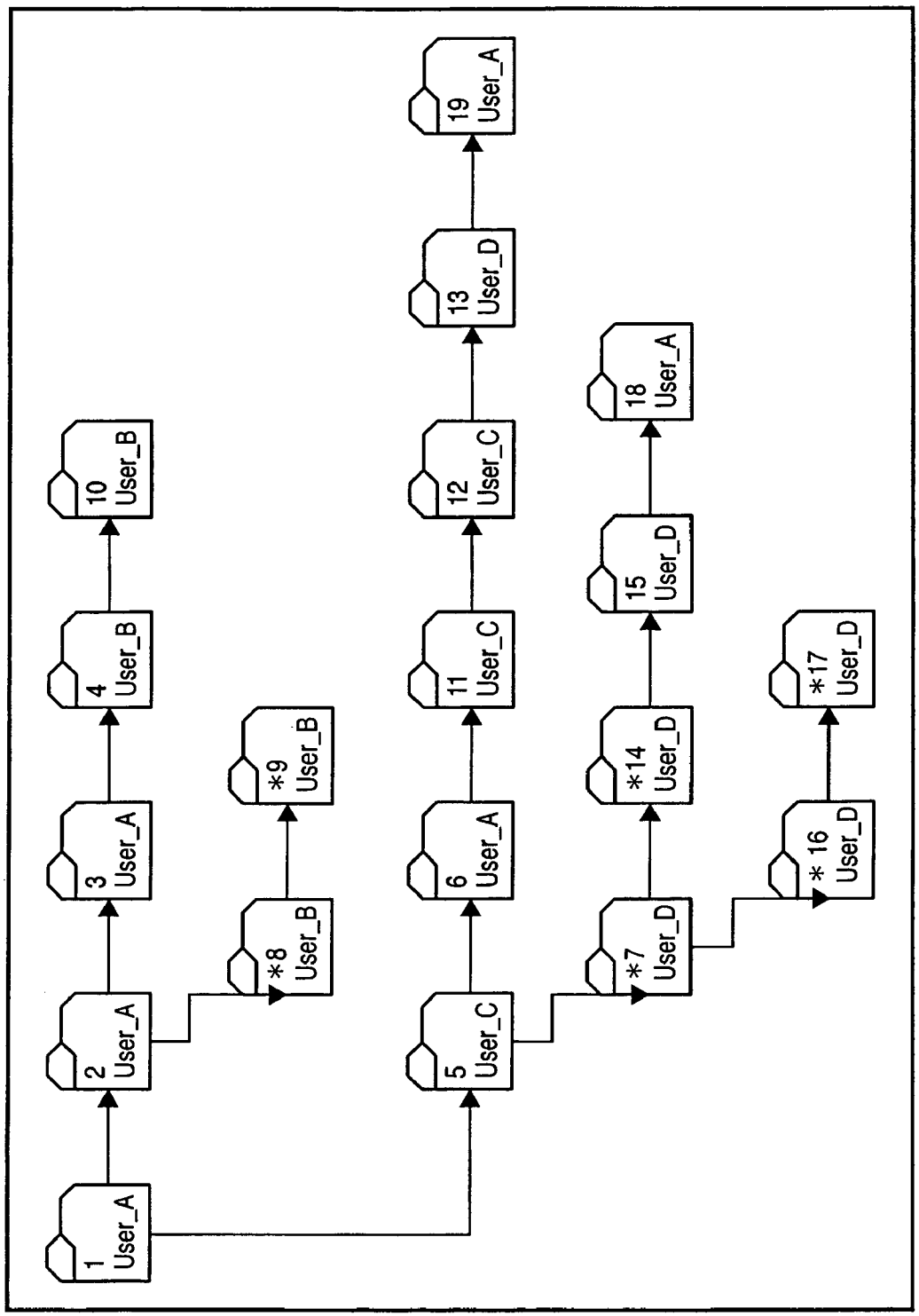
FIG. 7 is a view showing an example of the structure of the document ID tree table according to the embodiment of the present invention.

For example, when the document ID table 222 shown in FIG. 3 is registered, principal document data in the document ID tree table 224 are document data of document IDs "1" and "20". In this case, two document ID tree tables shown in FIGS. 5 and 6 manage the document data of document IDs "1" and "20". FIG. 7 shows a document ID tree table whose trunk document data is the document data of the document ID "1". FIG. 7 expresses updated document data side by side and derivative document data from top to bottom.

The structure shown in FIG. 7 is merely an example, and various tree structures can express update document data and derivative document data. For example, the tree structure can be three-dimensional.

The document ID tree display table 225 is used when a user selects document data using the document registration unit 211 and document search unit 212. The document ID tree display table 225 is formed by checking the user's access right of a user to document data in a designated document ID tree table on the basis of the document ID tree table, excluding files for which the user does not have any access right, and adjusting the relationship between documents. The document ID tree display table 225 has the same structure as that of the document ID tree table in FIGS. 5 and 6.

When displaying the document ID tree display table 225, a user can also designate a document ID and various filters in order to facilitate selection by the user.

A document registration process and document search process in the document update/management system will be explained with reference to flowcharts.

A document registration process to register a document in the document update/management system incorporated in the multifunctional peripheral will be described with reference to FIGS. 8A-8C.

Figure 8A:
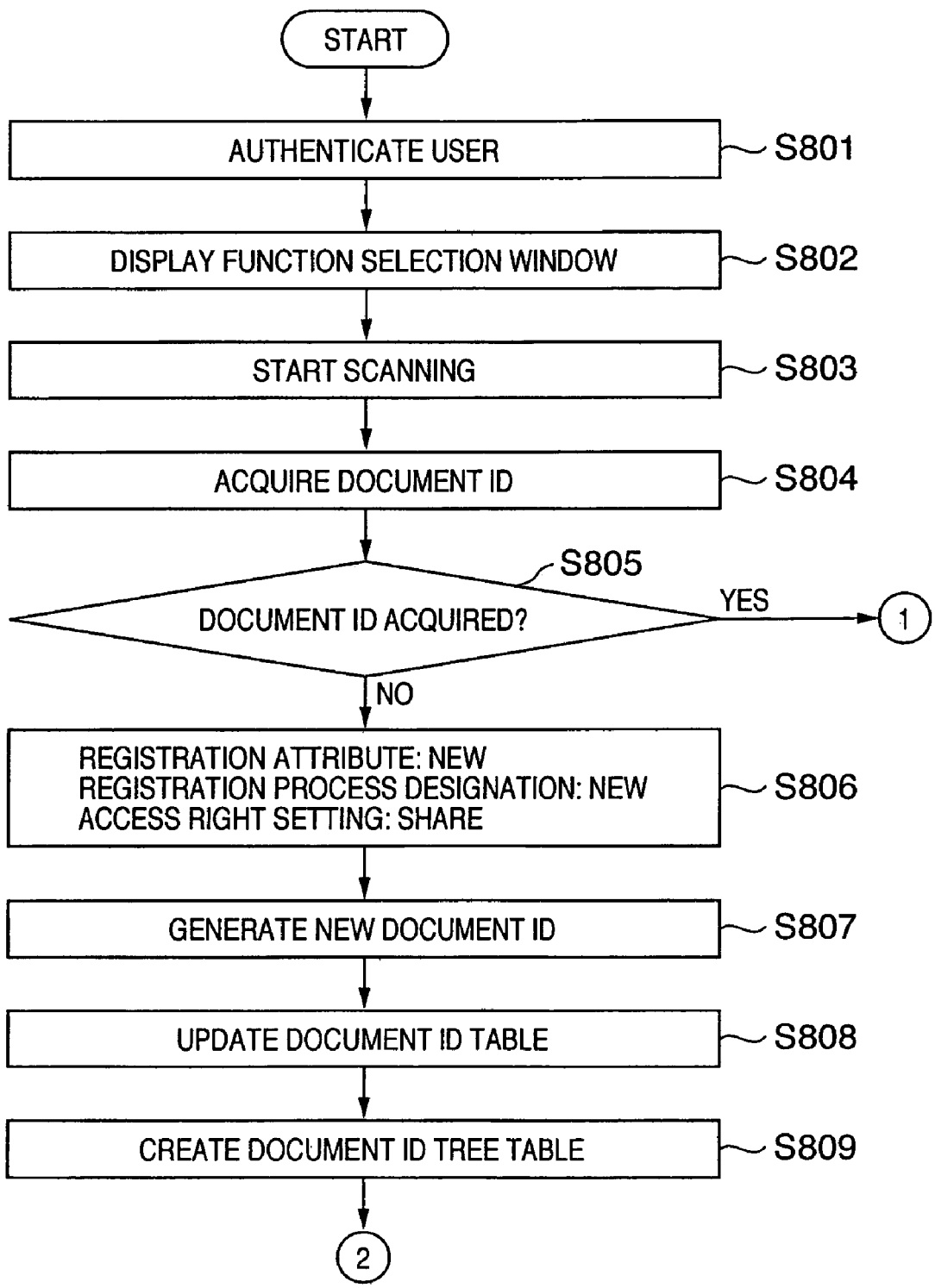
FIGS. 8A-8C are flowcharts showing a document registration process according to the embodiment of the present invention.
Figure 8B:
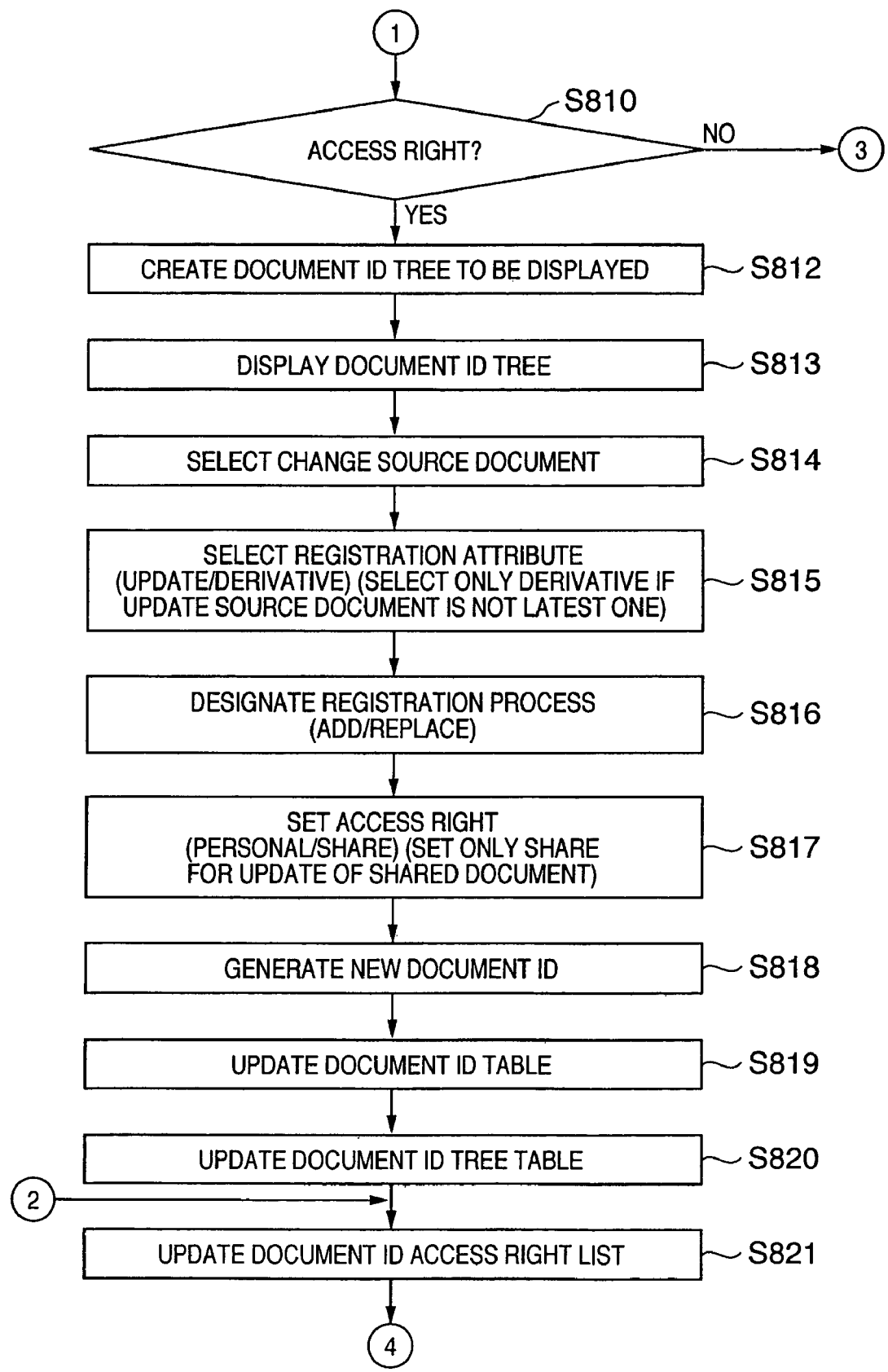
Figure 8C:
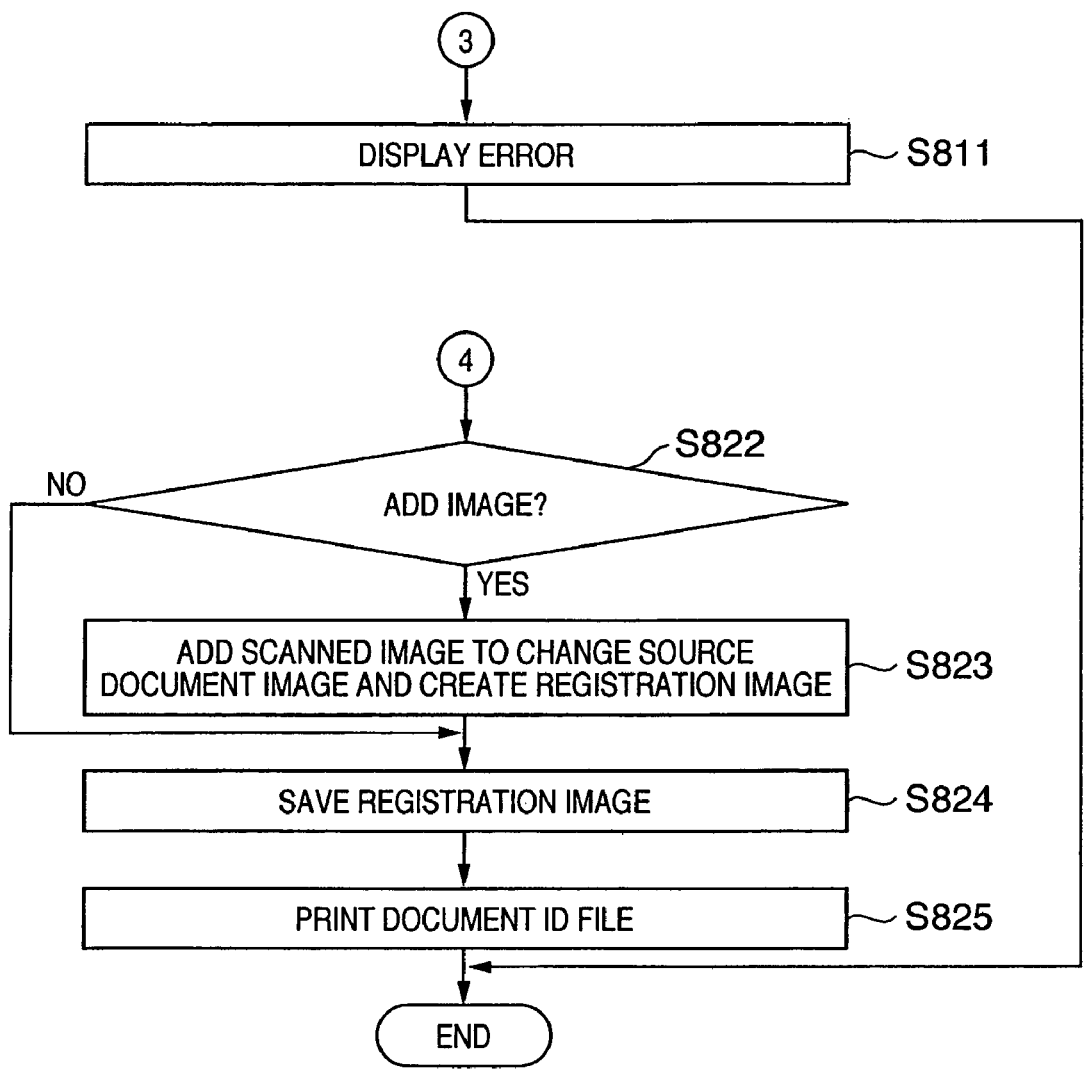

FIGS. 8A-8C are flowcharts showing the document registration process according to the embodiment of the present invention.

A process will be explained with reference to the flowchart until the point at which an updated version of a printed material (updated document) for the latest version of open document data is registered and saved in a searchable state using a document ID-embedded printed material (original ID document) as a key.

In the multifunctional peripheral 100, the user management unit 206 runs in an initial state, and allows an operation after user log-in. The user management unit 206 receives a user name and password on the basis of a user operation vis-à-vis the touch panel of the operation unit 107. The log-in operation may use an IC card or biometric authentication depending on the structure of the operation unit 107.

The user management unit 206 authenticates the user using the input user name and password and the user authentication unit 207 (step S801). The user authentication is performed not only within the multifunctional peripheral 100, but also by using, via the network processing unit 208, the function of the server 111 or another MFP 100 connected to the network 109 depending on the arrangement.

Upon completion of user authentication, the operation unit 107 displays a function selection window (step S802). An example of the function selection window will be described with reference to FIG. 9.

FIG. 9 is a view showing an example of the function selection window according to the embodiment of the present invention.

A function selection window 900 shown in FIG. 9 has various controls (buttons, fields, menus, and the like) for executing various functions of the multifunctional peripheral 100.

The function selection window 900 in FIG. 9 provides a copy button 901 and send/FAX button 904 for executing the copy function and send/FAX function, respectively. The function selection window 900 also provides a document search/print button 902 and document registration button 903 for executing "document registration" and "document search/print" functions, respectively, which form the document update/management system serving as a feature of the present invention.

FIG. 9 shows a display window when operating the copy button 901. In this case, a document area 905 displays various settings on copying. Reference numeral 906 denotes a status button which is operated to display various current statuses of the multifunctional peripheral 100. When the user operates the document registration button 903, the registration process is executed with reference to the state of FIG. 9.

Referring back to FIG. 8A, the multifunctional peripheral 100 monitors an operation to the function selection window. If the user operates the document registration button 903, the document registration unit 211 operates. The document registration unit 211 presents the user with a guide window on the operation unit 107 for setting a document to be registered on the scanner 106 and pressing the start button.

The user superposes one original ID document sheet on an updated document, places them on the scanner 106, and operates the start button on the operation unit 107. The multifunctional peripheral 100 detects the operation, and causes the scanner 106 to start scanning (step S803). To newly register a document, the user places only an updated document, i.e., a document to be newly registered.

After the user operates the start button, the scanning unit 201 scans the set document, and the image processing unit 205 converts a page image corresponding to each document sheet into image data.

The document registration unit 211 uses the document ID recognition unit 205a to acquire a document ID from image data of the first page (step S804).

It is determined whether the document ID was normally acquired (step S805). If no document ID was acquired (NO in step S805), it is determined to newly register the document, and a process (new registration process) in step S806 and subsequent steps is executed. If the document ID was acquired (YES in step S805), i.e., a document corresponding to the document ID was found, a process (document change process) in step S810 and subsequent steps is executed.

In the new registration process, predetermined information is defined for obtained image data. More specifically, the registration attribute is "new", registration process designation is "new", and access right setting is "share" in the embodiment (step S806).

A new document ID different from document IDs used is generated by looking up the document ID table 222 (step S807). In addition, items (e.g., a registration date, a tree ID, a registrant, the number of copies, and a file name) shown in FIG. 3 are set (step S808). The registration date is acquired from the clock function (not shown) of the multifunctional peripheral 100. As the tree ID, the same numerical value as the document ID is registered. As the registrant, the log-in user name is registered. The default copy count is 0, and the file name is set uniquely, including a save destination.

A document ID tree table 224 for the document to be registered is newly created to register contents (step S809). As shown in FIG. 5, the document ID tree table 224 registers a document ID, a related document ID (no related document ID exists when newly registering a document), and a registration attribute as a relationship. Then, the process advances to step S821.

In the document change process, the document ID access right list 223 is used to determine whether the registrant has the right to access an original document (step S810). At this time, it is determined whether the access right "share" is set for the target document ID, as shown in FIG. 4. If no access right "share" is set, it is determined from the document ID table 222 whether the registrant corresponds to the target document ID.

If the user does not have any access right (NO in step S810), the operation unit 107 displays an error display representing that no accessible document exists. Then, the registration process ends (step S811).

If the user has the access right (YES in step S810), a document ID tree display table 225 is created to prompt the user to select a registration source document from documents related to the document ID (step S812).

Figure 10A:
Figure 10C:
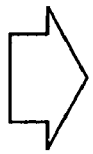

For example, as shown in FIGS. 10A-10C, a tree ID to which the document ID belongs is acquired from the document ID table 222. It is confirmed from the document ID access right list 223 and document ID table 222 whether the user has the access right for document IDs in a document ID tree table corresponding to the acquired tree ID.

When a document ID for which the user does not have any access right is set in the related document ID field of the document ID tree table, documents related to the document ID are traced back and checked until the relationship to a document ID for which the user has the access right is found. A document ID found by the check is set for the related document, and the relationship is set to "derivative". A table obtained by excluding information on document IDs for which the user does not have any access right is defined as a final document ID tree display table 225.

FIGS. 10A-10C show an example when the user name is "User_B", the document ID is "2", and the filtering target is "all documents".

Based on the created document ID tree display table 225, the operation unit 107 displays a document ID tree including candidates of an original document related to a document to be registered (step S813)

To facilitate selection by a user, it is also possible to display the relationship between documents and display the image of a selected document, as shown in FIG. 11. A document registration window shown in FIG. 11 will be explained.

A document registration window 1100 shown in FIG. 11 is displayed after operating the document registration button 903 in the function selection window 900 of FIG. 9. In FIG. 11, the same reference numerals as those in the function selection window 900 of FIG. 9 denote the same controls, and a detailed description thereof will be omitted.

The document registration window 1100 has a display area 1101 for displaying the update log of a document to be registered, and a thumbnail display area 1102 for displaying the thumbnail image of a document to be processed.

The display area 1101 displays the relationship between document data concerning update as a document update log on the basis of the document ID tree display table 225. The display area 1101 has buttons 1101a to 1101d for switching (filtering) display contents, and can switch the display contents in accordance with the purpose.

The button 1101a is used to display all the update logs (log list) of documents related to a document to be registered. The button 1101b is used to display only documents of the latest version related to the document to be registered. The button 1101c is used to display only documents of changed versions related to the document to be registered. The button 1101d is used to display only printed documents among documents related to the document to be registered.

In the display area 1101, a folder icon representing a currently selected document has a display form (e.g., is displayed by a bold line or is colored) different (identifiable) from that of folder icons representing other related documents. In FIG. 11, a document of a document ID "2"is in a selected state.

For the selected document, the thumbnail display area 1102 displays the thumbnail image of the document, and document information such as the file name, the version number, the number of pages, and the file date/print execution.

Figure 12:
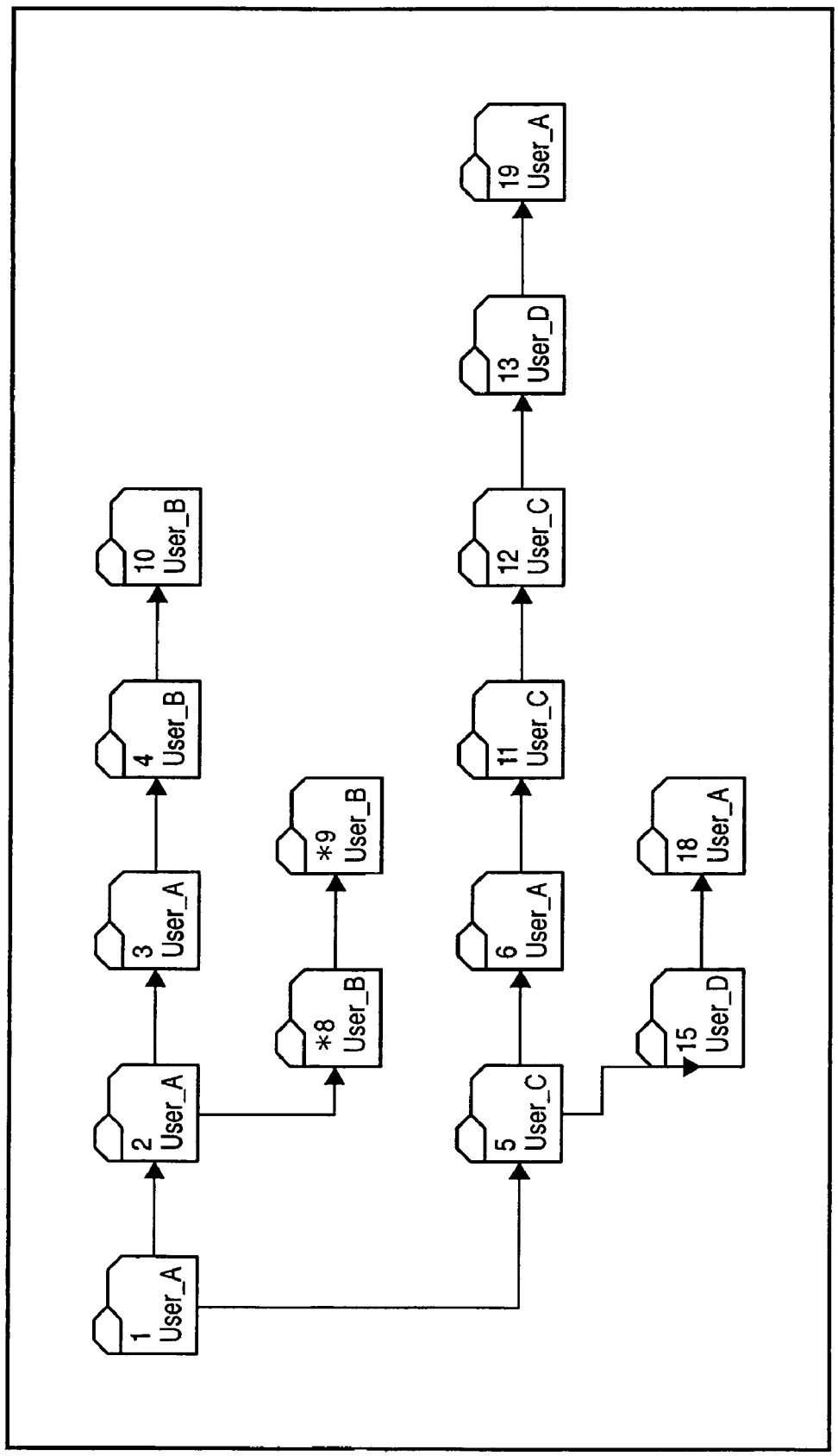
FIG. 12 is a view showing an example of the structure of the document ID tree display table according to the embodiment of the present invention.

For example, the user can easily recognize the relationship between documents by laying out update documents side by side starting from a new document, and laying out derivative documents from top to bottom in the relation view (document ID tree) between documents displayed in the display area 1101, as shown in FIG. 12. The user can also select various filtering processes (processes corresponding to the buttons 1101a to 1101d) in order to easily select a registration source document.

The user can make various designation settings in the above-described step S806 and steps S815 to S817 with, e.g., radio buttons 1103 to 1105.

The radio button 1103 is used to designate a registration attribute in registering a document. As registration attributes, "new", "update", and "derivative" are prepared. The radio button 1104 is used to designate a registration process in registering a document. As registration processes, "add" and "replace" are prepared. The radio button 1105 is used to designate access right setting in registering a document. As access right settings, "share" and "personal" are prepared.

The operation window in FIG. 11 is merely an example, and the present invention is not limited to this. Instead of designation with radio buttons, it is also possible to, when a user selects an update document, display choices for setting the access right in a popup window in response to the selection and set a selected choice. As access rights, various grouping settings such as designation of a group registered in advance may be provided in addition to "share" and "personal".

Figure 13:
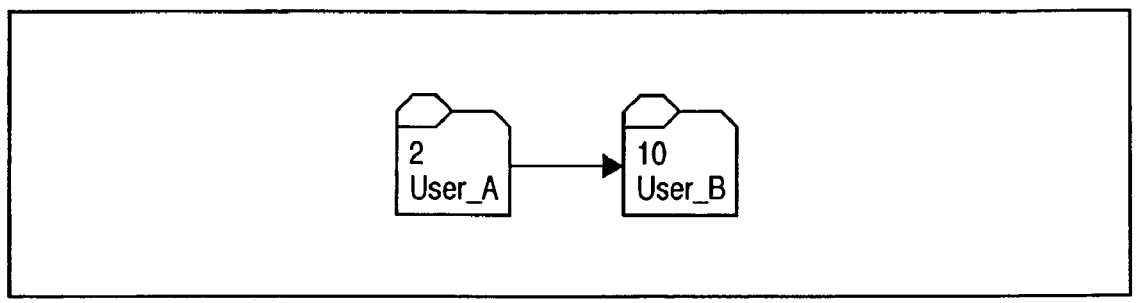
FIG. 13 is a view showing another example of the structure of the document ID tree display table according to the embodiment of the present invention.
Figure 15:
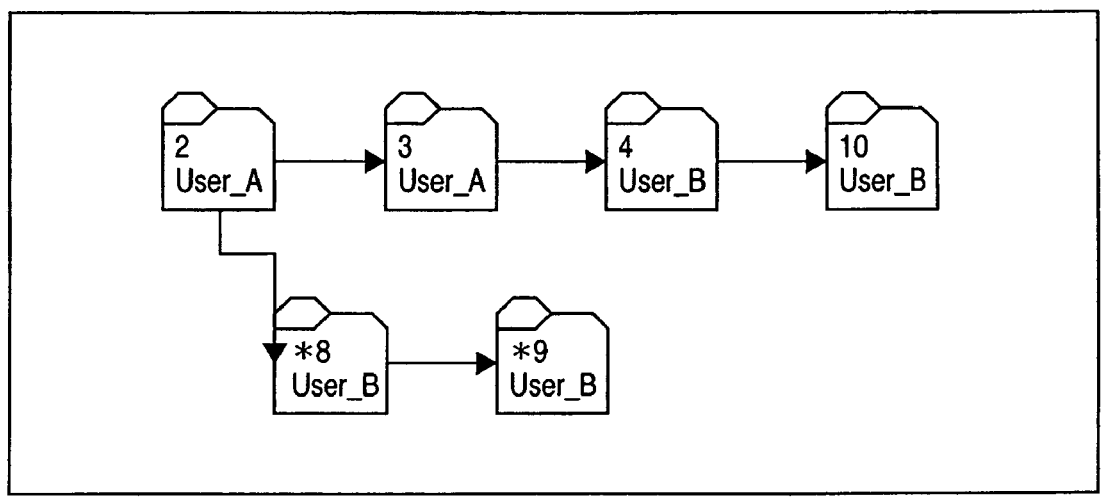
FIG. 15 is a view showing still another example of the structure of the document ID tree display table according to the embodiment of the present invention.
Figure 16:
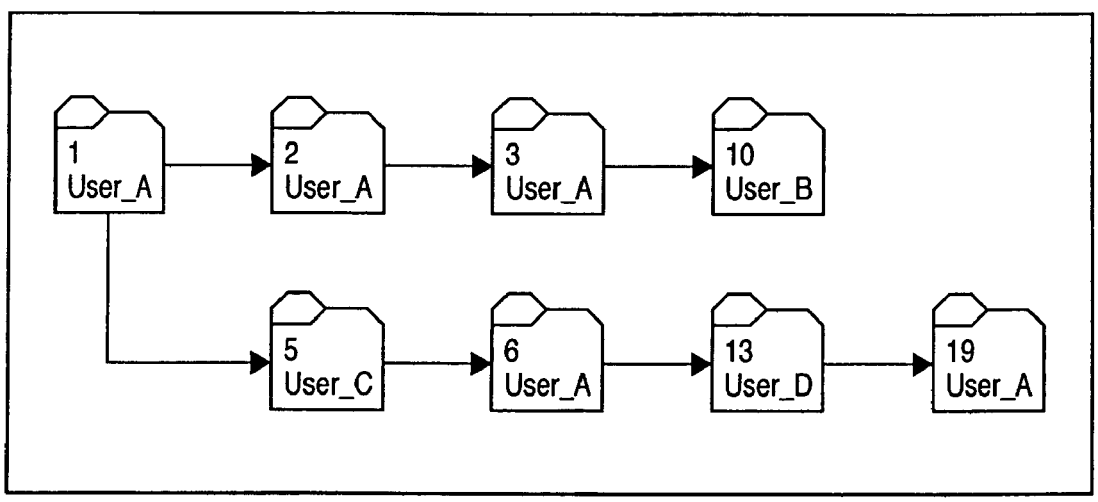
FIG. 16 is a view showing still another example of the structure of the document ID tree display table according to the embodiment of the present invention.

An example of the document ID tree displayed in the display area 1101 will be explained. A display example when filtering the document ID tree display table 225 will be described. FIG. 13 shows a case where only a designated document (ID=2) and an update document of the latest version are displayed in accordance with the user name (User_B). FIG. 14 shows a case where only a designated document (ID=2) and its related update documents are displayed in accordance with the user name (User_B). FIG. 15 shows a case where a designated document (ID=2) and its subsequent related documents are displayed in accordance with the user name (User_B). FIG. 16 shows a case where documents related to a designated document (ID=2) having a designated number (e.g., 10) of copies or more are displayed in accordance with the user name (User_B).

These filtering processes are merely examples, and the user can execute desired filtering processes by designating parameters corresponding to various filtering processes in accordance with the application purpose.

Referring back to FIG. 8B, in the processes of steps S814 to S818 to be described later, an operation to the operation unit 107 is accepted, and various settings are selected and input on the basis of the operation contents. An operation window for selecting and inputting various settings is properly displayed on the basis of the operation.

First, selection of a registration source document by the user is accepted. That is, monitoring the selection operation allows to select the registration source (change source) document (step S814). Assume that the user selects the latest document.

Then, selection of a registration attribute is accepted. That is, monitoring the selection operation allows to select a registration attribute (step S815).

As the registration attribute, the user selects whether the current document is to be registered as an update document (latest version) of the original document or as a derivative. When an update document has already been registered in relation to the original document, the user can register the current document only as a derivative. In this case, the user selects the latest document, and no update document is registered yet. Assume that the user selects "update" though he can select either "update" or "derivative".

Selection of a registration process method as to whether to add scanned pages to an original document and register (add) the resultant document, or to register (replace) only scanned pages is accepted as a registration process. That is, monitoring the selection operation allows designating a registration process method (step S816). Assume that the user selects "replace".

Setting of the access right to a document to be registered is accepted. That is, monitoring the setting operation allows to set the access right (step S817).

As basic access rights, the user can select "personal" representing that only the registrant can access the document, and "share" representing that all users can access the document. Since "share" is designated for the original document, "share" is also automatically designated for the update document. When registering a derivative document or updating a document having "personal" setting, the user can select either "personal" or "share".

After the user selects various settings, the document registration unit 211 generates a new document ID different from document IDs used by looking up the document ID table 222 (step S818). In addition, the document registration unit 211 sets items (e.g., a registration date, a tree ID, a registrant, the number of copies, and a file name) shown in FIG. 3 (step S819). These settings are identical to those in step S808.

The document ID tree table 224 represented by the tree ID is updated (step S820). In this case, the document ID of the document to be registered is added, the document ID of the original document designated by the user is set as a related document ID, and the registration attribute is set as the relationship. As a result, the relationship between documents is saved.

The document ID of the document to be registered is added to the document ID access right list 223, and the access right designated by the user is set to update the document ID access right list 223 (step S821). In this case, the share is set to 1.

To save a registration image, whether to add the image is determined as designation of the registration process (step S822). If no image is to be added (NO in step S822), the scanned image file replaces the image file of the original document, and the process ends. If the image is to be added (YES in step S822), the scanned image file is added to the image file of the original document to create a registration image file (step S823).

The registration image file is saved with a file name set in the document ID table 222 (step S824).

The document ID-embedded image is printed for the purpose of subsequent selection of the registration document. That is, the image processing unit 205 thumbnails the cover and pages of the registered document into one page. The document ID composition unit 205b embeds a document ID in the page, and the printing unit 202 outputs the document ID-embedded page.

By the above process, a new document is registered for its related document and saved in a searchable state using a document ID-embedded printed material as a key.

A document search/printing process to search for and print a document by the document update/management system installed in the multifunctional peripheral 100 will be described with reference to FIG. 17.

Figure 17:
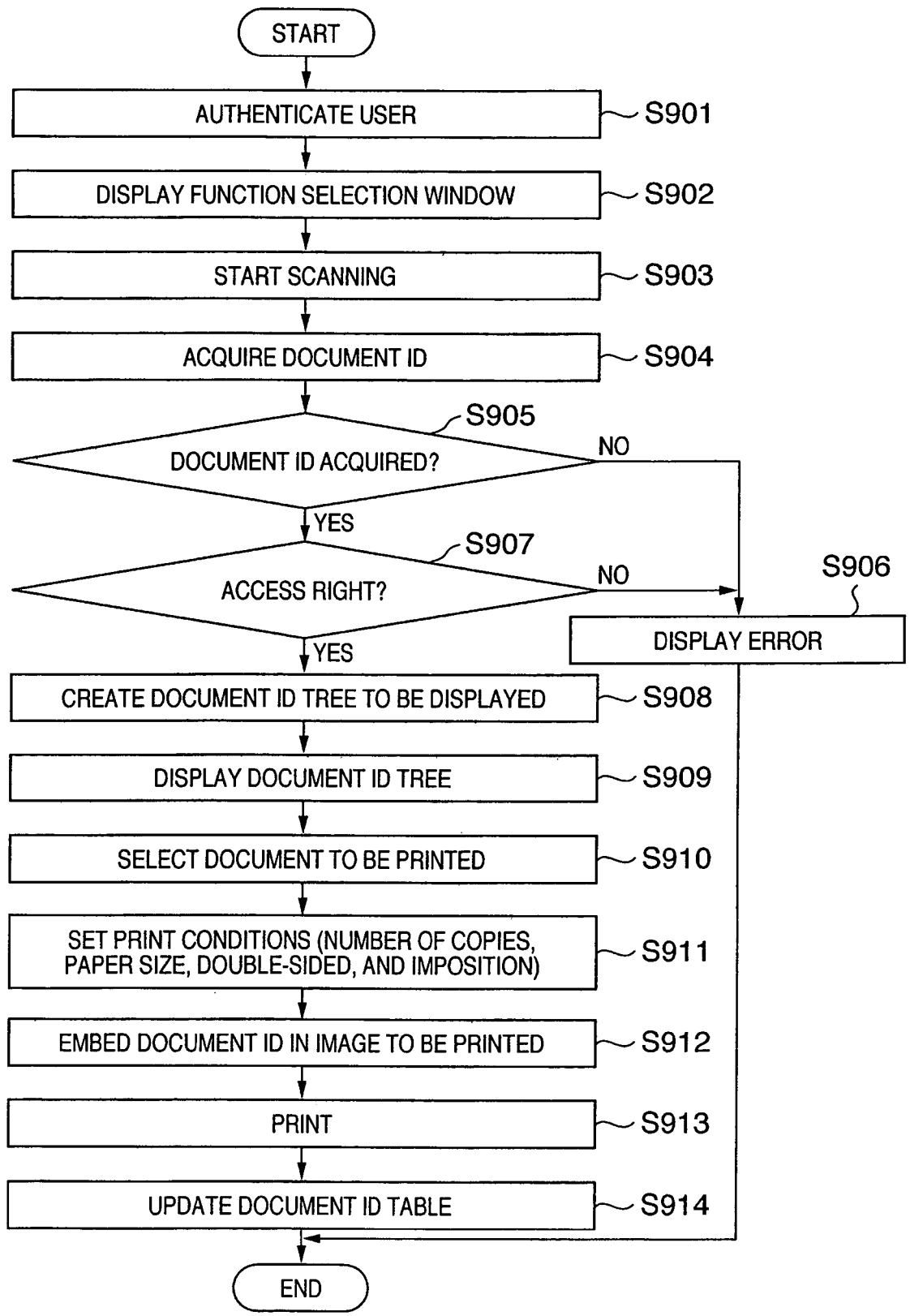
FIG. 17 is a flowchart showing a document search/printing process according to the embodiment of the present invention.

FIG. 17 is a flowchart showing the document search/printing process according to the embodiment of the present invention.

A process will be explained with reference to the flowchart until an open document of a desired version is selected from related documents and acquired as a printed material using a document ID-embedded printed material (to be referred to as an original ID document hereinafter) as a key.

In the multifunctional peripheral 100, the user management unit 206 runs in an initial state, and allows an operation after user log-in. The user management unit 206 receives a user name and password on the basis of a user operation to the touch panel of the operation unit 107. The log-in operation may use an IC card or biometrical authentication depending on the structure of the operation unit 107.

The user management unit 206 authenticates the user using the input user name and password and the user authentication unit 207 (step S901). The user authentication is performed not only within the multifunctional peripheral 100, but also by using, via the network processing unit 208, the function of the server 111 or another MFP 100 connected to the network 109 depending on the arrangement.

Figure 18:
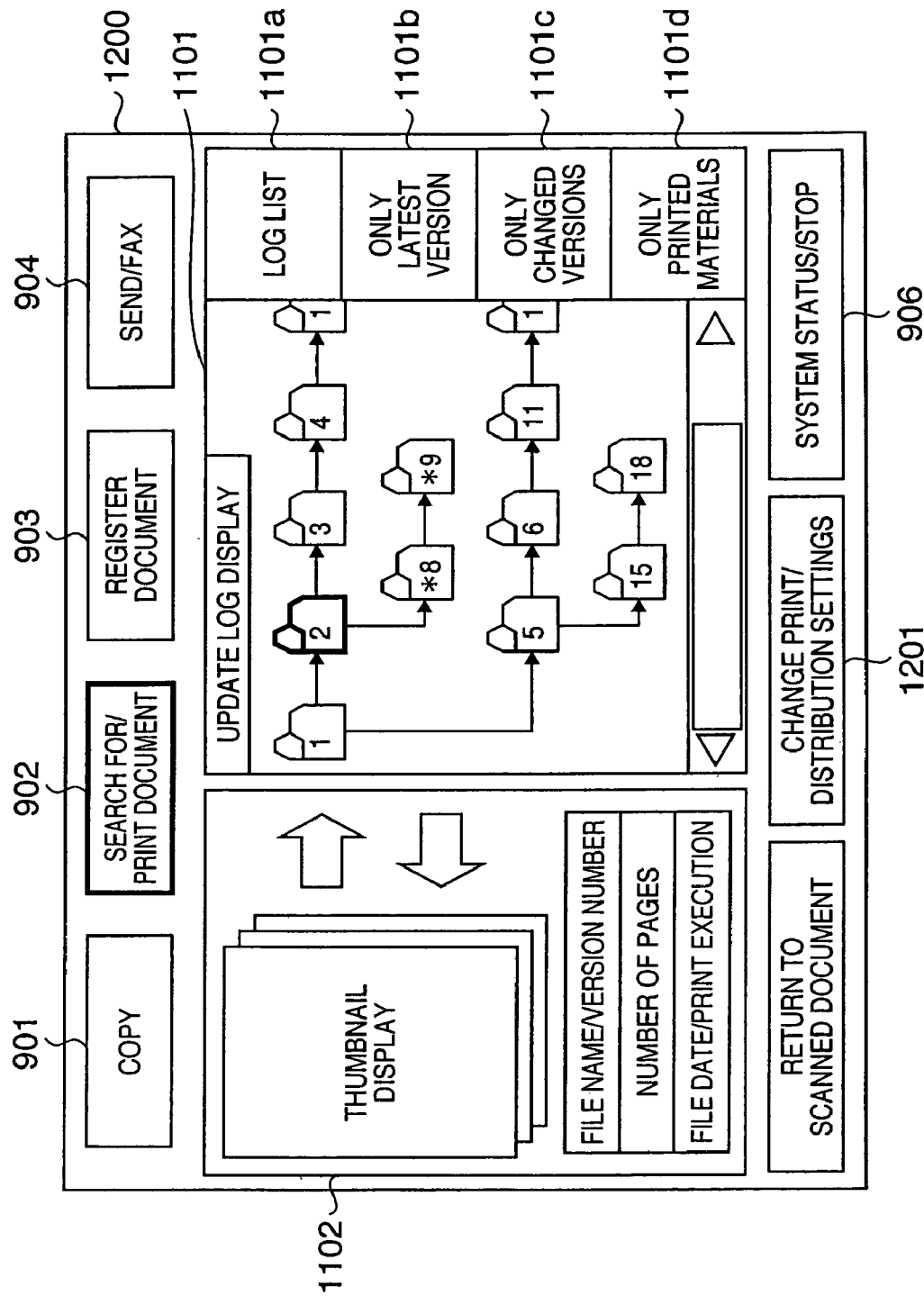
FIG. 18 is a view showing an example of a document search/print window according to the embodiment of the present invention.

Upon completion of user authentication, the operation unit 107 displays a function selection window (step S902). At this time, the operation unit 107 displays the above-mentioned function selection window 900 in FIG. 9. When the user operates the document search/print button 902, the document search/printing process is executed in the state of FIG. 9. In this case, the function selection window 900 switches to a document search/print window 1200 in FIG. 18. The document search/print window 1200 in FIG. 18 has a layout complying with the document registration window 1100 in FIG. 11. A button 1201 is used to execute printing and display an operation window for making print settings and the like.

The multifunctional peripheral 100 monitors an operation to the function selection window. If the user operates the document search/print button 902, the document search unit 212 operates. The document search unit 212 presents the user with a guide window on the operation unit 107 for setting an original ID document on the scanner 106 and pressing the start button.

The user sets the original ID document on the scanner 106 and operates the start button on the operation unit 107. Then, the multifunctional peripheral 100 detects the operation, and causes the scanner 106 to start scanning (step S903).

After the user operates the start button, the scanning unit 201 scans the set document, and the image processing unit 205 converts a page image corresponding to each document sheet into image data.

The document search unit 212 uses the document ID recognition unit 205a to acquire a document ID from the image data (step S904).

It is determined whether the document ID was acquired (step S905). If no document ID was acquired (NO in step S905), the operation unit 107 displays an error display representing that no target document exists, and the document search/printing process ends (step S906).

If the document ID was acquired (YES in step S905), i.e., a document corresponding to the document ID was found, it is determined using the document ID access right list 223 whether the registrant has the right to access the original document (step S907). In the embodiment, it is determined whether the access right "share" is set for the target document ID, as shown in FIG. 4. If no access right "share" is set, it is determined from the document ID table 222 whether the user is the registrant of the document ID.

If the user does not have any access right (NO in step S907), the operation unit 107 displays an error display representing that no accessible document exists. Then, the document search/printing process ends (step S906).

If the user has the access right (YES in step S907), a document ID tree display table 225 is created to prompt the user to select a registration source document from documents related to the document ID (step S908). This process is the same as the example of FIGS. 10A-10C described in step S812 in the registration process of FIG. 9.

Based on the created document ID tree display table 225, the operation unit 107 displays candidates of a document to be printed (step S909). This process is the same as the examples of FIGS. 11 and 12 described in step S813 in the registration process of FIG. 9.

In the processes of steps S910 and S911 to be described later, an operation to the operation unit 107 is accepted, and various settings are selected and input on the basis of the operation contents. An operation window for selecting and inputting various settings is properly displayed on the basis of the operation.

First, selection of a document to be printed by the user is accepted. That is, monitoring the selection operation allows to select the document to be printed (step S910). Assume that the user selects the latest document.

Then, designation of print settings is accepted. That is, monitoring the designation operation allows to designate print settings (step S911). As the print settings, at least the number of copies is designated. The user can designate various print settings (e.g., paper size, double/single-sided, and imposition) on a dedicated print setting window, in addition to the number of copies.

The designated document file is extracted on the basis of the document ID table 222, and the document ID composition unit 205b embeds a document ID in the file (step S912). The printing unit 202 outputs the document ID-embedded file (step S913).

Finally, the number of copies by current printing is added to the number of copies with the printed document ID in the document ID table 222, thereby updating the document ID table 222 (step S914). This process facilitates selection of a mass-printed file on the basis of the document ID table 222.

By the above process, a document selected by a user from related documents can be acquired as a printed material using a document ID-embedded printed material as a key.

In the above example, a user designates a desired document from a displayed document ID tree and prints. It is also possible to provide choices "only latest version", "only oldest version", and "only finally printed document". In this case, the user selects one of the choices to search for a target document and automatically print it.

A message whether to print is displayed together with information of the found document, and printing is executed in accordance with a response (semi-automatic printing). When registering an update or derivative document, a version number, alphabetical letters, or the like capable of specifying the document may be added. The user inputs the version number or alphabetical letters to search for a document of the specified version and print automatically or semi-automatically.

In the above embodiment, the printing unit 202 outputs a document ID-embedded image in step S913. Alternatively, the image processing unit 205 may convert an image into a file, the user may select a distribution destination, and the distribution unit 203 may distribute the image file by a communication function such as e-mail. The same process as that described above can be achieved by printing the distributed file and using the printed document. It is also possible to fax the image file from the FAX unit 204.

Figure 19:
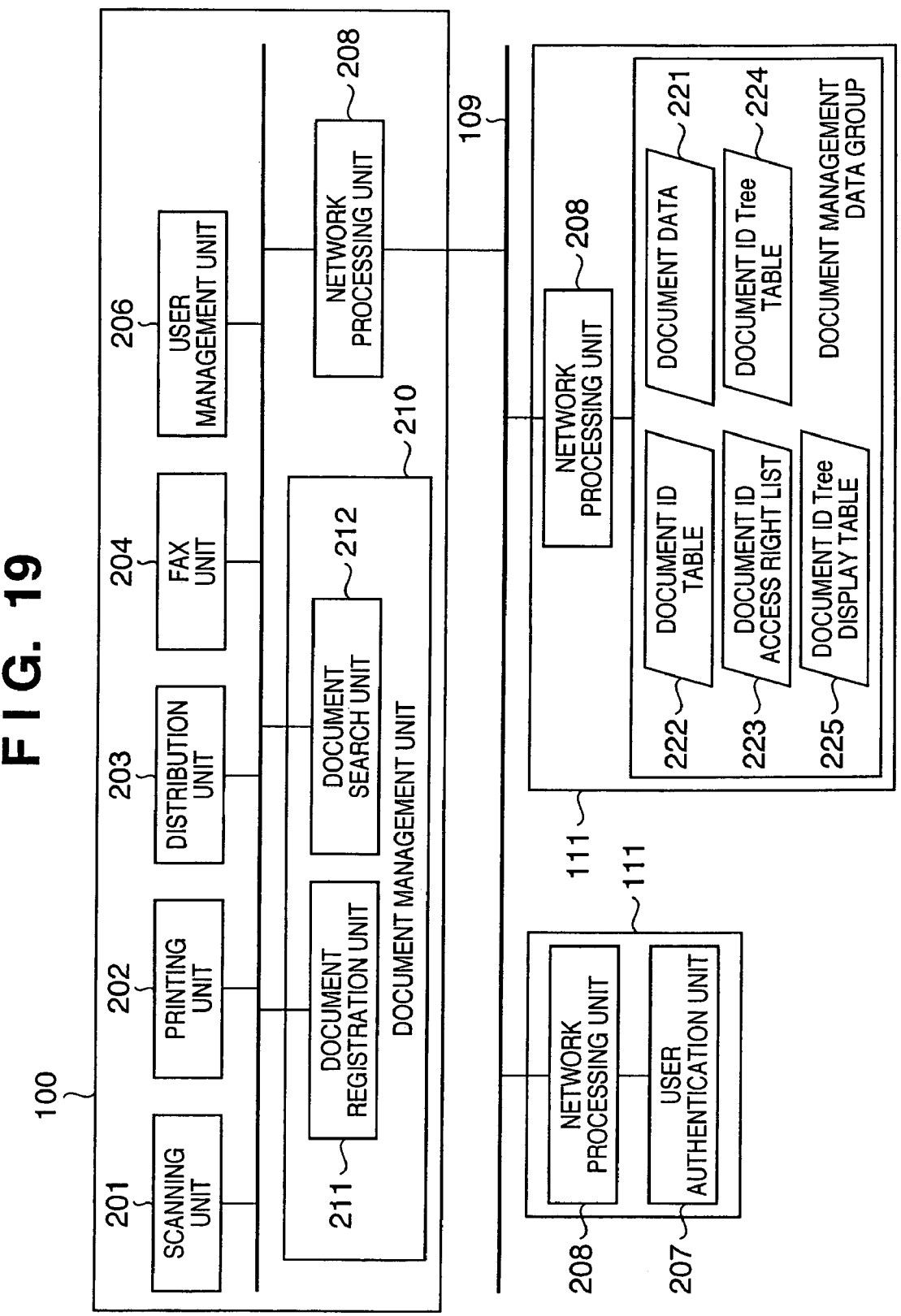
FIG. 19 is a block diagram showing another example of the schematic configuration of the document update/management system including a network-compatible multifunctional peripheral according to the embodiment of the present invention.

In the above embodiment, the multifunctional peripheral 100 incorporates various building elements shown in FIG. 2, but the present invention is not limited to this. For example, as shown in FIG. 19, the multifunctional peripheral 100 may use the user authentication unit 207 arranged in another device such as another multifunctional peripheral or the server 111 on the network 109. Various document management data groups used by the document management unit 210 may be held in another device such as another multifunctional peripheral or the server 111 on the network 109 by ensuring a save location for the data groups in the document management unit 210.

As described above, the embodiment can use additional information for specifying a document embedded in a document image, and present a user with documents related to a specified document. The embodiment can provide an environment where the user can print his document and acquire, by a simple operation, an update version of the document, an original document used to create the document, another document created based on the same document, a mass-printed document, and the like.

The embodiment can prevent leakage of confidential information by limiting user access to only documents for which the user has the access right.

A printed document can be used as a key for selecting a document saved in the document management system which designates a document ID.

When registering a document, the user can detect its relative document. By defining whether the target document is an update or derivative document of an original document, the user can detect the latest version.

Only the difference of a document can be registered. No entire original document need be prepared or scanned, which shortens the registration time.

The user can clearly recognize a document ID tree table to which the target document belongs, and can easily search the document ID tree table.

The registrant of a registered document can be determined, and only the registrant is permitted to access the document.

Even for a shared document, the access right can change depending on whether the target document is an update or derivative document of the shared document. For example, the access right is set to "share" for an initial document and "personal" for its update or derivative document. In this case, it is preferable to select various browsing methods such that a user having no access right is inhibited from browsing the document ID tree itself, or a user can browse the document ID tree but cannot browse document contents.

As the access right setting method, various operation authorities may be selected such that a user is permitted to browse a document on the operation unit 107 but inhibited from printing and transmitting the document. When registering a document, a message that creation of a subsequent update or derivative document is inhibited, or a message that deletion of a document is inhibited may be attached as a document attribute.

The number of copies can be selected as an. arrangement of selecting a document such as meeting materials.

The user can confirm the relationship between documents from information in the document ID tree table in registration or search & printing.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-352334 filed on Dec. 6, 2005, which is hereby incorporated by reference herein in its entirety.

What is claimed is:

1. An image processing apparatus having a scanning unit for scanning an image and a storage unit for storing an image, comprising:

a registration unit constructed to register an image scanned by the scanning unit in the storage unit;

a first setting unit constructed to set, in an attribute information table, attribute information for managing an image registered by said registration unit;

a second setting unit constructed to set, in a related information table together with the attribute information, relationship between the image registered by said registration unit and a related image in the storage unit;

a search unit constructed to search the storage unit for an image specified by attribute information embedded in the image scanned by the scanning unit;

a creation unit constructed to acquire an image related to the image found by a search by said search unit from the storage unit by looking up the related information table, and create a relation view of the image;

a display unit constructed to display an operation window including the relation view created by said creation unit;

a third setting unit constructed to set, in an access list for each attribute information, a right to access a corresponding image;

an authentication unit constructed to authenticate a user who operates the image processing apparatus; and a determination unit constructed to determine, by referring to the access list, whether the user authenticated by said authentication unit has a right to access the image found by a search by said search unit, wherein said creation unit acquires the image related to the image found by a search by said search unit on the basis of a determination result of said determination unit by looking up the related information table, and creates the relation view of the image.

2. The apparatus according to claim 1, further comprising an output unit adapted to output, to a designated output destination, an image designated via the operation window displayed by said display unit.

3. The apparatus according to claim 2, wherein said output unit embeds corresponding attribute information in the designated image and prints the designated image.

4. The apparatus according to claim 1, wherein the attribute information contains information representing a related information table to which an image belongs, a storage location of the image, a user ID of a user who designates registration of the image by said registration unit, and the number of copies of the image.

5. The apparatus according to claim 1, wherein the related information table sets at least attribute information of an image registered by said registration unit, and registration attribute information designated in registration.

6. An image processing apparatus having a scanning unit for scanning an image and a storage unit for storing an image, comprising:
   a registration unit constructed to register an image scanned by the scanning unit in the storage unit;
   a first setting unit constructed to set, in an attribute information table, attribute information for managing an image registered by said registration unit;
   a second setting unit constructed to set, in a related information table together with the attribute information, relationship between the image registered by said registration unit and a related image in the storage unit;
   a search unit constructed to search the storage unit for an image specified by attribute information embedded in the image scanned by the scanning unit;
   a creation unit constructed to acquire an image related to the image found by a search by said search unit from the storage unit by looking up the related information table, and create a relation view of the image; and
   a display unit constructed to display an operation window including the relation view created by said creation unit;
   wherein when said registration unit is to register an image, said creation unit acquires an image related to attribute information embedded in the image to be registered from the storage unit by looking up the related information table, and creates the relation view of the images, and
   wherein said display unit displays an operation window including the relation view created by said creation unit, and a first designation portion for designating an update/derivative of the image to be registered as attribute information of the image which is designated on the basis of the relation view and is to be registered.

7. The apparatus according to claim 6, wherein said display unit comprises, on the operation window, a second designation portion for designating to add the image to be registered to a designated image and register the image, or to replace a designated image with the image to be registered and register the image.

8. A method of controlling an image processing apparatus having a scanning unit for scanning an image and a storage unit for storing an image, comprising:
   a registration step of registering an image scanned by the scanning unit in the storage unit;
   a first setting step of setting, in an attribute information table, attribute information for managing an image registered in the registration step;
   a second setting step of setting, in a related information table together with the attribute information, relationship between the image registered in the registration step and a related image in the storage unit;
   a search step of searching the storage unit for an image specified by attribute information embedded in the image scanned by the scanning unit;
   a creation step of acquiring an image related to the image found by a search in the search step from the storage unit by looking up the related information table, and creating a relation view of the image;
   a display step of displaying an operation window including the relation view created in the creation step;
   a third setting step of setting, in an access list for each attribute information, a right to access a corresponding image;
   an authentication step of authenticating a user who operates the image processing apparatus; and
   a determination step of determining, by referring to the access list, whether the user authenticated by said authentication step has a right to access the image found by a search by said search step,
   wherein said creation step acquires the image related to the image found by a search by said search step on the basis of a determination result of said determination step by looking up the related information table, and creates the relation view of the image.

9. A computer-readable storage medium storing computer-executable process steps that, when executed by a computer, cause the computer to control an image processing apparatus having a scanning unit for scanning an image and a storage unit for storing an image, said process steps comprising:
   a registration step of registering an image scanned by the scanning unit in the storage unit,
   a first setting step of setting, in an attribute information table, attribute information for managing an image registered in the registration step,
   a second setting step of setting, in a related information table together with the attribute information, relationship between the image registered in the registration step and a related image in the storage unit,
   a search step of searching the storage unit for an image specified by attribute information embedded in the image scanned by the scanning unit,
   a creation step of acquiring an image related to the image found by a search in the search step from the storage unit by looking up the related information table, and creating a relation view of the image,
   a display step of displaying an operation window including the relation view created in the creation step;
   a third setting step of setting, in an access list for each attribute information, a right to access a corresponding image;
   an authentication step of authenticating a user who operates the image processing apparatus; and
   a determination step of determining, by referring to the access list, whether the user authenticated by said authentication step has a right to access the image found by a search by said search step,
   wherein said creation step acquires the image related to the image found by a search by said search step on the basis of a determination result of said determination step by looking up the related information table, and creates the relation view of the image.

10. A method of controlling an image processing apparatus having a scanning unit for scanning an image and a storage unit for storing an image, comprising:
   a registration step of registering an image scanned by the scanning unit in the storage unit;

a first setting step of setting, in an attribute information table, attribute information for managing an image registered by said registration step;

a second setting step of setting, in a related information table together with the attribute information, relationship between the image registered by said registration step and a related image in the storage unit;

a search step of searching the storage unit for an image specified by attribute information embedded in the image scanned by the scanning unit;

a creation step of acquiring an image related to the image found by a search by said search step from the storage unit by looking up the related information table, and creating a relation view of the image; and a display step of displaying an operation window including the relation view created by said creation step;

wherein when said registration step is to register an image, said creation step acquires an image related to attribute information embedded in the image to be registered from the storage unit by looking up the related information table, and creates the relation view of the image, and wherein said display step displays an operation window including the relation view created by said creation step, and a first designation portion for designating an update/derivative of the image to be registered as attribute information of the image which is designated on the basis of the relation view and is to be registered.

11. A computer-readable storage medium storing computer-executable process steps that, when executed by a computer, cause the computer to control an image processing apparatus having a scanning unit for scanning an image and a storage unit for storing an image, said process steps comprising:

a registration step of registering an image scanned by the scanning unit in the storage unit;

a first setting step of setting, in an attribute information table, attribute information for managing an image registered by said registration step;

a second setting step of setting, in a related information table together with the attribute information, relationship between the image registered by said registration step and a related image in the storage unit;

a search step of searching the storage unit for an image specified by attribute information embedded in the image scanned by the scanning unit;

a creation step of acquiring an image related to the image found by a search by said search step from the storage unit by looking up the related information table, and creating a relation view of the image; and a display step of displaying an operation window including the relation view created by said creation step;

wherein when said registration step is to register an image, said creation step acquires an image related to attribute information embedded in the image to be registered from the storage unit by looking up the related information table, and creates the relation view of the image, and wherein said display step displays an operation window including the relation view created by said creation step, and a first designation portion for designating an update/derivative of the image to be registered as attribute information of the image which is designated on the basis of the relation view and is to be registered.

* * * * *